(12) United States Patent
West

(10) Patent No.: US 11,085,674 B1
(45) Date of Patent: Aug. 10, 2021

(54) ELECTROCALORIC-BASED COOLING SYSTEM

(71) Applicant: United States of America as Represented by the Administrator of NASA, Washington, DC (US)

(72) Inventor: William C. West, South Pasadena, CA (US)

(73) Assignee: U.S.A, as Represented by the Administrator of the National Aeronautics and Space Administration, Washington, DC (US)

( * ) Notice: Subject to any disclaimer, the term of this patent is extended or adjusted under 35 U.S.C. 154(b) by 186 days.

(21) Appl. No.: 16/055,499

(22) Filed: Aug. 6, 2018

(51) Int. Cl.
*F25B 21/00* (2006.01)

(52) U.S. Cl.
CPC ........ *F25B 21/00* (2013.01); *F25B 2321/001* (2013.01)

(58) Field of Classification Search
CPC ............................ F25B 21/00; F25B 2321/001
See application file for complete search history.

(56) References Cited

U.S. PATENT DOCUMENTS

| | | | | |
|---|---|---|---|---|
| 4,599,677 | A * | 7/1986 | Lawless | H01G 4/1254 252/519.15 |
| 5,536,963 | A * | 7/1996 | Polla | H01L 37/02 257/417 |
| 6,877,325 | B1 * | 4/2005 | Lawless | F25B 21/00 62/3.1 |
| 8,695,353 | B2 | 4/2014 | Casasanta | |
| 8,769,967 | B2 | 7/2014 | Kruglick | |
| 9,614,251 | B2 * | 4/2017 | Farmer | B82Y 30/00 |
| 2004/0125543 | A1 * | 7/2004 | Hirano | H01G 9/012 361/523 |
| 2011/0076542 | A1 * | 3/2011 | Farmer | B82Y 30/00 429/120 |
| 2011/0146308 | A1 | 6/2011 | Casasanta | |
| 2011/0298333 | A1 * | 12/2011 | Pilon | H01L 37/02 310/306 |
| 2012/0055174 | A1 | 3/2012 | Kruglick | |
| 2015/0033762 | A1 | 2/2015 | Chang et al. | |
| 2017/0043600 | A1 | 2/2017 | Abbott, Jr. | |
| 2017/0054066 | A1 * | 2/2017 | Cann | H01L 23/373 |
| 2018/0363956 | A1 * | 12/2018 | Eastman | F25B 21/00 |

OTHER PUBLICATIONS

Moya, Xavier Muñoz-Rojas, David. (2016). Materials for Sustainable Energy Applications—Conversion, Storage, Transmission, and Consumption—13.3 Electrocaloric Effect. Taylor & Francis, pp. 772-774 (Year: 2016).*
Daniele Sette et al., "Electrocaloric Cooler Combining Ceramic Multi-Layer Capacitors and Fluid", APL Materials 4, 091101, American Institute of Physics, 2016.
Claudio Cazorla, "In the Search of New Electrocaloric Materials: Fast Ion Conductors", Results in Physics 5, pp. 262-263, 2015.
Bob Yirka, "A New Efficient and Portable Electrocaloric Cooling Device", Phys.org, Sep. 15, 2017.

* cited by examiner

*Primary Examiner* — Frantz F Jules
*Assistant Examiner* — Erik Mendoza-Wilkenfel

(57) ABSTRACT

An electrocaloric-based cooling system includes a solid electrolyte, which includes a silver conducting electrolyte sandwiched between a first electrode and a second electrode. The solid electrolyte when biased shows an electrocaloric effect.

20 Claims, 7 Drawing Sheets

Fig. 7
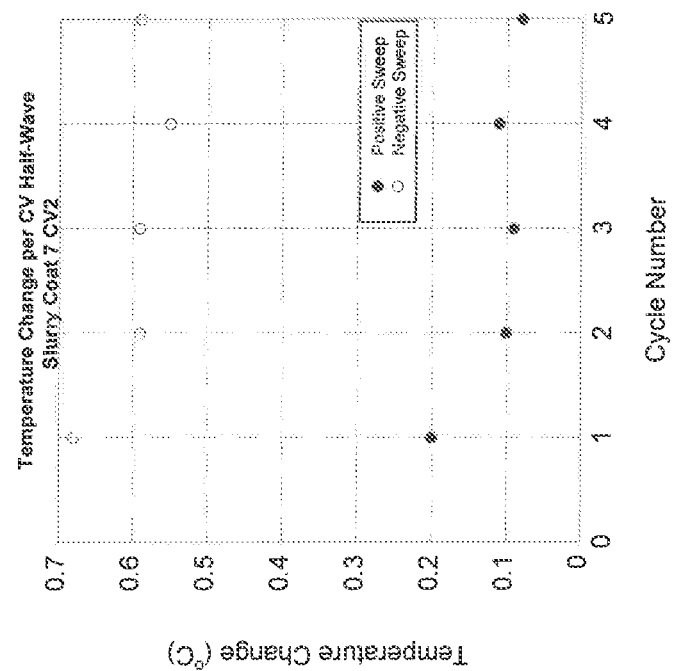
700A
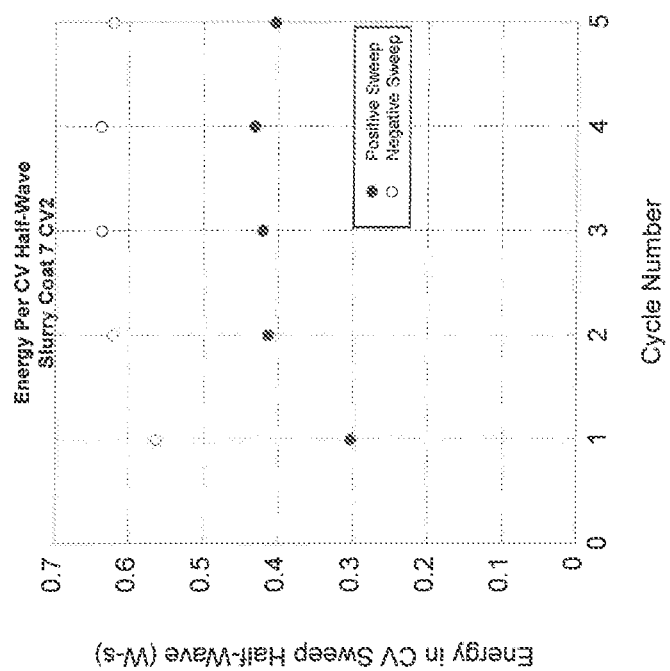
700B

US 11,085,674 B1

ELECTROCALORIC-BASED COOLING SYSTEM

ORIGIN OF THE INVENTION

Embodiments of the present invention described herein were made in the performance of work under NASA contract NNNC12AA01C and are subject to the provisions of Public Law #96-517 (35 U.S.C. § 202) in which the Contractor has elected not to retain title.

FIELD

The present invention relates to an electrocaloric-based cooling system.

BACKGROUND

Electrocaloric materials are a relatively new class of compounds that can be used in all-solid-state systems to produce cooling devices for sensors, detectors, or electronic components without the need for mechanical compressors, coolant gases, and related parts. As such, the system can be readily miniaturized, and can have greater reliability since there are fewer moving parts than conventional coolant systems. The cooling effect of electrocaloric devices, unlike thermoelectric (e.g. Peltier) devices, is achieved by the application of a voltage across the medium, resulting in a change in the entropy of the material. To maintain thermodynamic equilibrium, the system responds to an entropy change with a temperature change. This electric field-induced temperature change can be exploited for cooling by way of alternating the applied voltage while switching the electrocaloric material between the device being cooled and a thermal sink.

There are two main types of electrocaloric materials that have been demonstrated in solid-state devices. The first are ferroelectric materials that are characterized by a spontaneous polarization. The second class of materials include electro-responsive polymers such as polyvinylidene fluoride (PVDF).

Recently, a third class of materials was hypothesized by another group, but not confirmed experimentally, and are known as fast ion conductors. Given the potentially large entropy change associated with moving between a superionic and non-conducting states, these materials are likely to be superior electrocaloric materials.

Thus, fabrication and testing of simple two-electrode solid electrolyte devices to assess the potential electrocaloric properties of the electrocaloric cooling system may be beneficial.

SUMMARY

Certain embodiments of the present invention may provide solutions to the problems and needs in the art that have not yet been fully identified, appreciated, or solved by current electrocaloric systems. For example, some embodiments generally pertain a solid electrolyte that when biased shows an electrocaloric effect.

In an embodiment, an apparatus may include a solid electrolyte comprised of a silver conducting electrolyte that is sandwiched between a first electrode and a second electrode.

In another embodiment, an electrocaloric device includes a solid electrolyte sandwiched between a first electrode and a second electrode. The solid electrolyte is a silver conducting electrolyte configured to show an electrocaloric effect when biased. The electrocaloric device also includes a binder configured to keep the silver conducting electrolyte together.

In yet another embodiment, an electrocaloric device includes a solid electrolyte sandwiched between a first electrode and a second electrode. The first electrode and the second electrode are configured to allow an application of an electric field across the silver conducting electrolyte and inhibit electrochemical decomposition of the silver conducting electrolyte during the application of the electric field. The solid electrolyte is a silver conducting electrolyte configured to show an electrocaloric effect when biased. The electrocaloric device also includes a binder configured to keep the silver conducting electrolyte together.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 7 are graphs illustrating a change in temperature and energy as a function of applied voltage, according to an embodiment of the present invention.

DETAILED DESCRIPTION OF THE EMBODIMENTS

Figure 1:
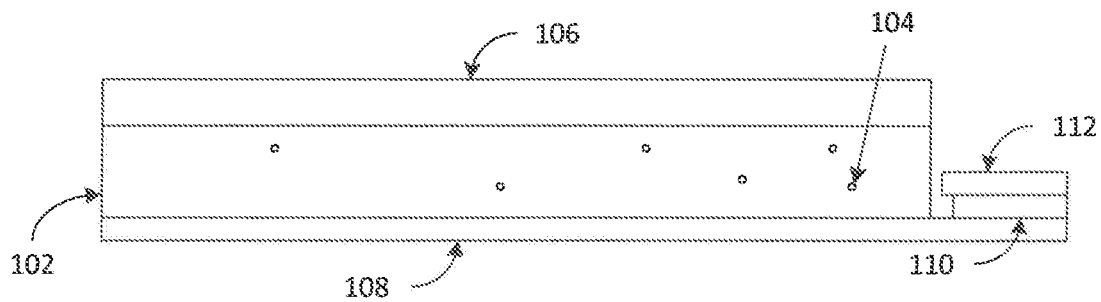
FIG. 1 is diagram illustrating an electrocaloric device, according to an embodiment of the present invention.

FIG. 1 is diagram illustrating an electrocaloric device 100, according to an embodiment of the present invention. In an embodiment, an electrocaloric device 100 includes a solid electrolyte 102 sandwiched between a first electrode 106 and a second electrode 108. Solid electrolyte 102 may be a silver conducting electrolyte configured to show an electrocaloric effect when biased. In some embodiments, silver electrolyte is composed of rubidium silver iodine ($RbAg_4I_5$). In some embodiments, solid electrolyte 102 may be comprised of amorphous sulfides and selenides of germanium and arsenic with high (ca. 20-40 atomic %) concentrations of dissolved silver or copper.

In some further embodiments, a binder 104 is used keep the silver conducting electrolyte together. In an embodiment, the binder is composed of an organic material such as polyvinylidene difluoride (PVDF) or styrene-butadiene rubber (SBR).

In certain embodiments, first electrode 106 is a nickel electrode situated on top of the solid electrolyte 102. In one embodiment, second electrode 108 is an indium tin oxide situated (ITO) below solid electrolyte 102. In another embodiment, second electrode 108 is a titanium electrode situated below solid electrolyte 102. In other words, both electrodes 102 and 108 may be any type of conductive material that allows for the application of an electric field across solid electrolyte 102, while inhibiting the electrochemical decomposition of solid electrolyte 102 at electrode 106 or 108 during the application of the electric field, in certain embodiments. In an embodiment, these conductive electrode materials may be coated with thin non-conductive materials to further inhibit the electrochemical decomposition of the solid electrolyte at the electrode.

In some embodiments, a graphite adhesive 110 is used to make an aluminum foil 112 contact with second electrode 108. This allows for convenient, low electrical resistivity attachment of electrodes 106 or 108 to a power supply.

While aluminum foil 112, which is attached to graphite adhesive 110, provides a way to make low electrical resistivity contact to electrodes 106 or 108, it should be appreciated that any metal foil, such as aluminum foil 112, will sufficiently function for this application. Aluminum foil was employed since it is inexpensive and easily handled.

With some of these embodiments, a greater temperature swing for a heating or cooling cycle may be realized. For instance, electrocaloric device 100 may provide for higher efficiency by way of greater temperature swings.

An electrical bias applied across first electrode 106 and second electrode 108 imposing an electric field onto solid electrolyte 102. The randomly distributed network of mobile cations and associated immobile anions form aligned dipoles in response to the applied electric field. This decreases the system entropy with a concomitant change in temperature.

Removal of the field (e.g. shorting the electrodes) may result in the re-randomization of the mobile cations with increase in entropy and opposite change in temperature. Connecting and disconnecting the solid electrolyte to a heat sink and the device to be cooled during the applied field and shorting steps may result in heat pumping. This connection and disconnection may even be carried out by plating and stripping a thin metal film from the mobile ions (e.g., silver or copper) onto the blocking electrode supplied by the non-blocking electrode.

Further, when an electric field or a voltage is applied between a first electrode 106 and a second electrode 108, the dipoles are rearranged. By doing so, the electric field is much greater, and with a greater electric field, the effect of solid electrolyte 102 is also greater. In one example, when the dipoles rearrange, a temperature change is realized. In this example, solid electrolyte 102 may then decompose, like any electrolyte. To avoid this, first (nickel) electrode 106 and second (ITO) electrode 108 are such that do not encourage the decomposition of solid electrolyte 102.

Figure 2:
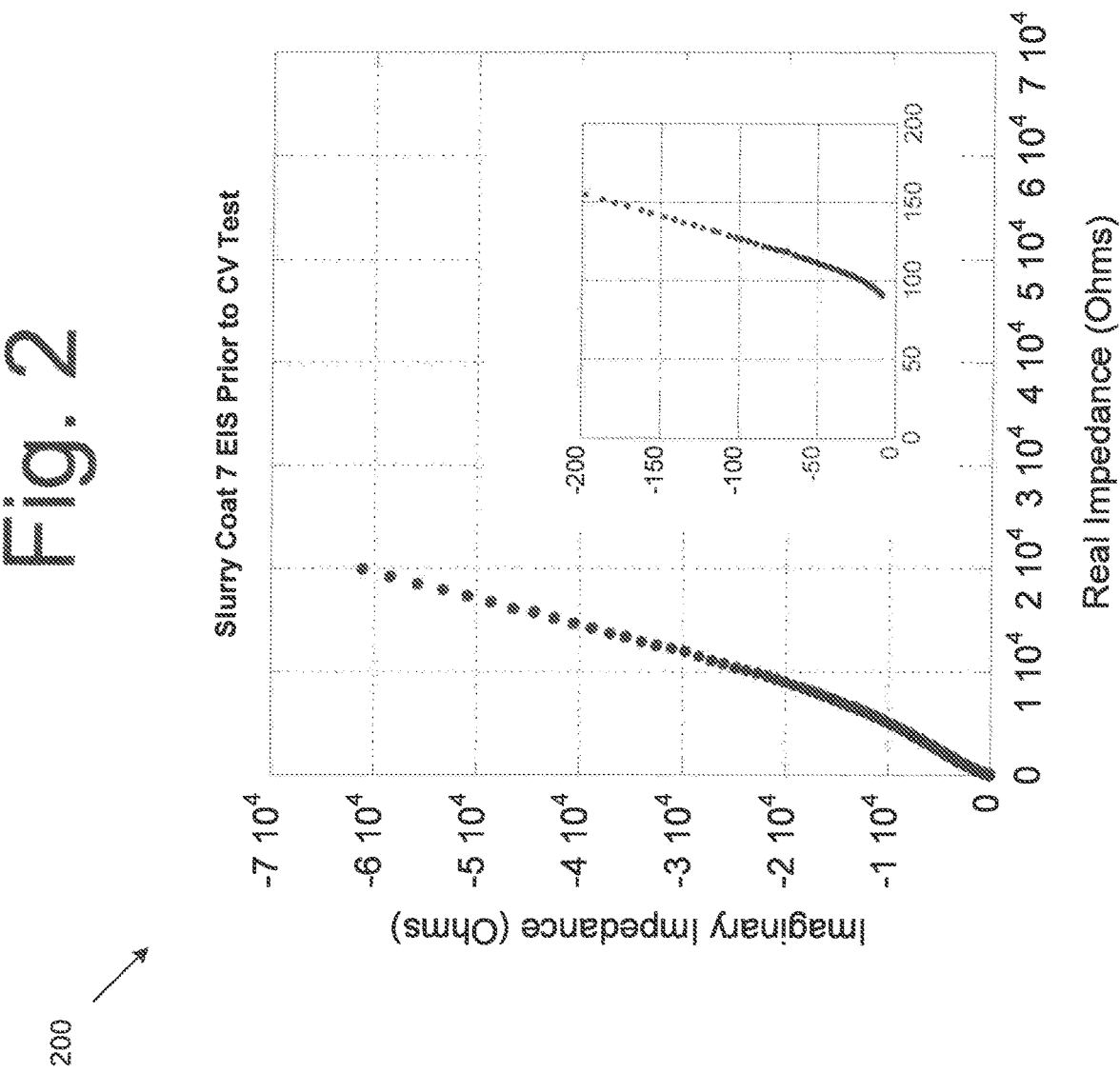
FIG. 2 is a graph illustrating an electrochemical impedance spectroscopy (EIS), according to an embodiment of the present invention.

FIG. 2 is a graph 200 illustrating an electrochemical impedance spectroscopy (EIS), according to an embodiment of the present invention. In graph 200, the cells exhibit expected blocking electrode EIS spectrum.

Figure 3:
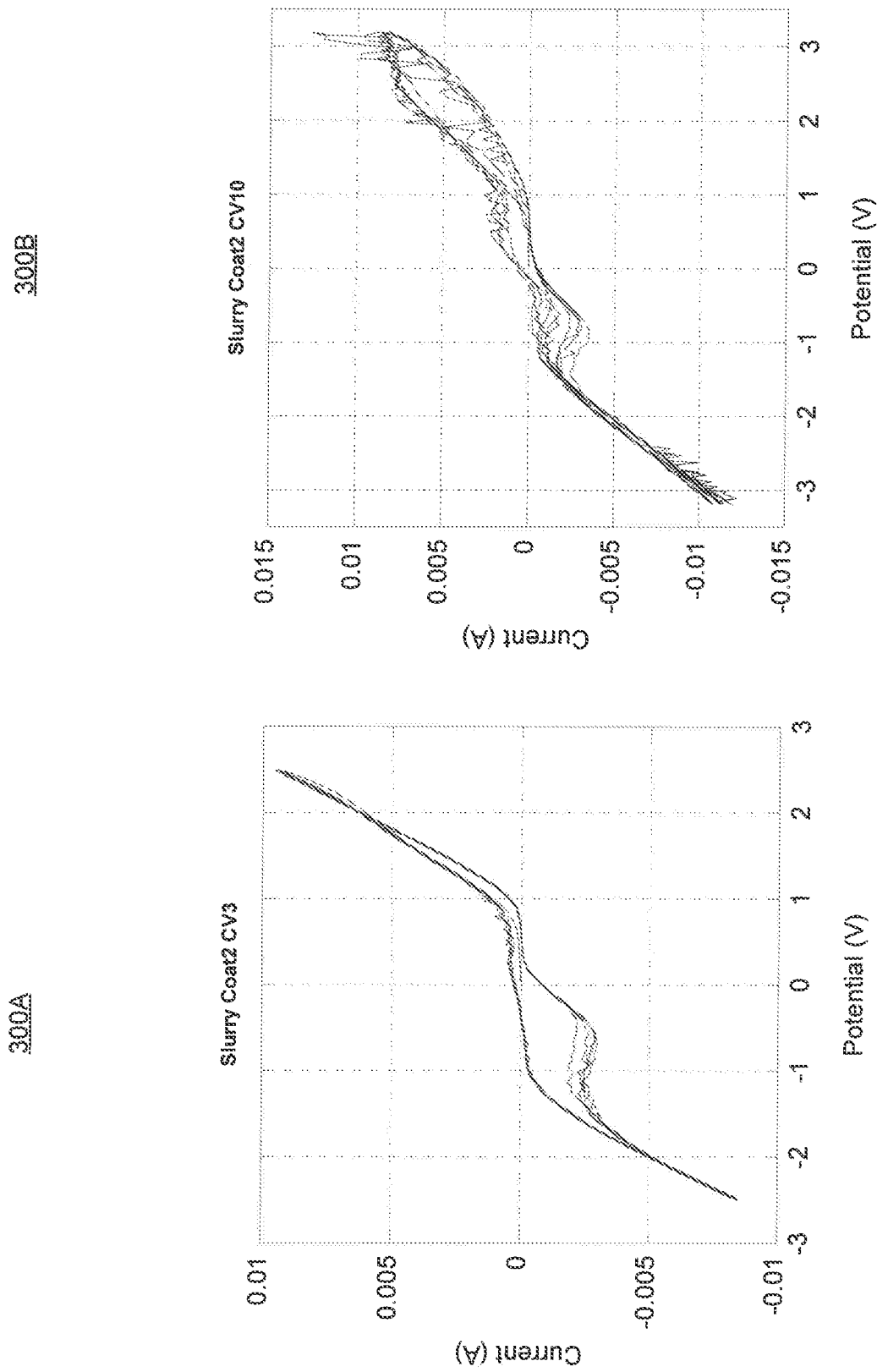
FIG. 3 are graphs illustrating cyclic voltammetry scans, according to an embodiment of the present invention.

FIG. 3 are graphs 300A and 300B illustrating cyclic voltammetry scans, according to an embodiment of the present invention. In graphs 300A and 300B, the voltage is applied and swept up and down. This is followed by measuring a current on the y-axis. Graph 300B shows that the solid electrolyte tends to decompose at elevated voltage.

Figure 4:
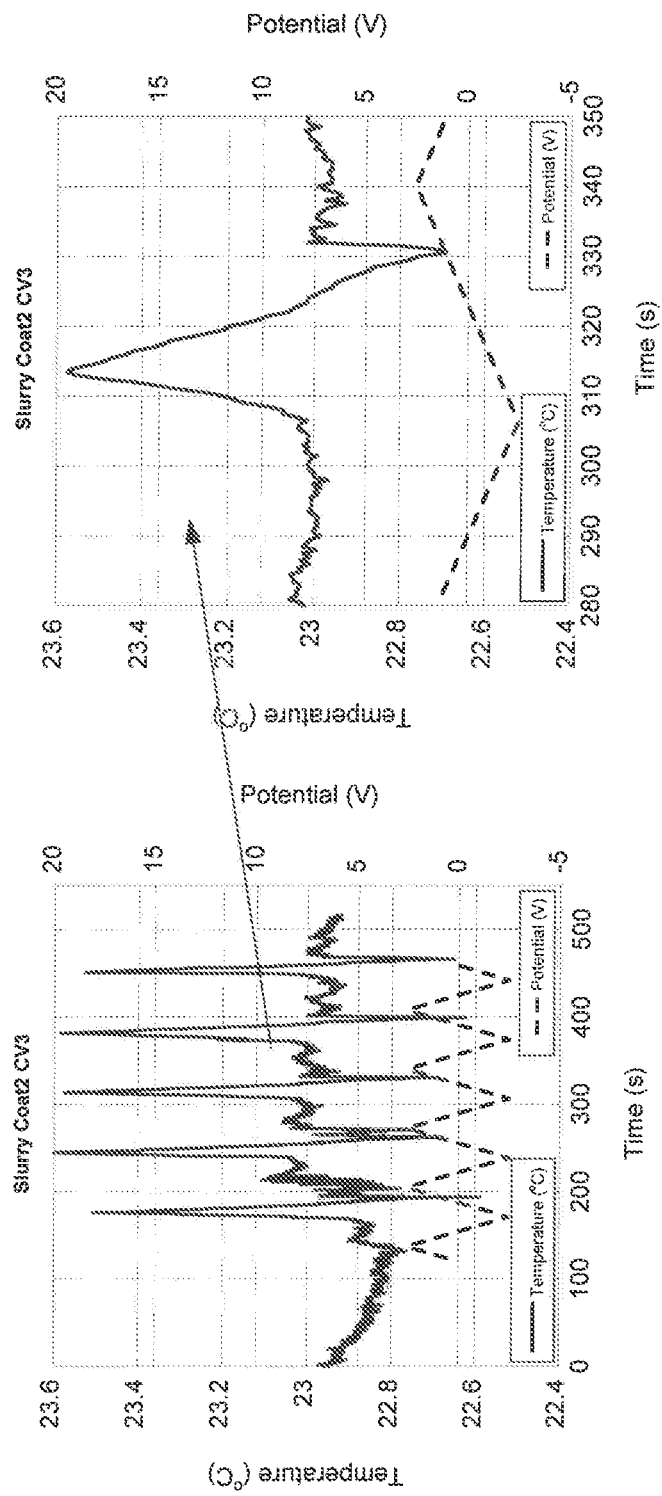
FIG. 4 are graphs illustrating a representative time-temperature-voltage output, according to an embodiment of the present invention.

FIG. 4 are graphs 400A and 400B illustrating a representative time-temperature-voltage output, according to an embodiment of the present invention. In graphs 400A and 400B, the temperature change is consistent with the electrocaloric events so that the voltage is a function of time. Specifically, there is fairly significant temperature change asymmetry, when voltage is swept up and down (i.e., temperature going into the positive and then down to the negative).

Figure 5:
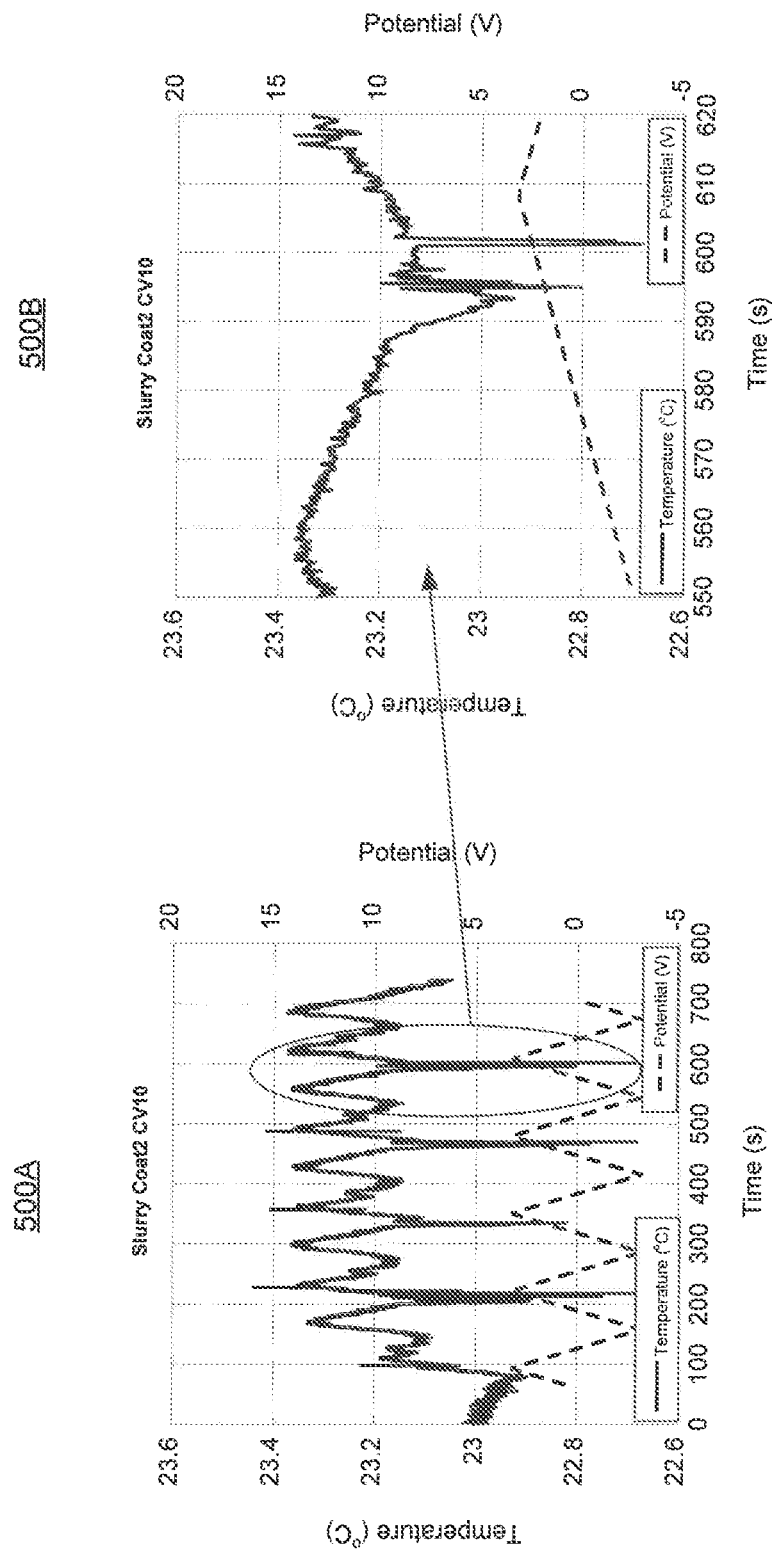
FIG. 5 are graphs illustrating a representative time-temperature-voltage output, according to an embodiment of the present invention FIG. 6 are graphs illustrating a change in temperature as a function of applied voltage, according to an embodiment of the present invention.

FIG. 5 are graphs 500A and 500B illustrating a representative time-temperature-voltage output, according to an embodiment of the present invention. As shown in graphs 500A and 500B, applied voltage during cyclic voltammetry sweep results in Joule heating and concomitant temperature increase. In addition, a sharp and reproducible endothermic peak is observed at ca. +1V, followed by a sharp exothermic peak is observed at −2.7V. The exothermic peak is superimposed onto the Joule heating peak. These exothermic and endothermic peaks that appear with the application and removal of an applied voltage are consistent with expected electrocaloric effects.

Figure 6:
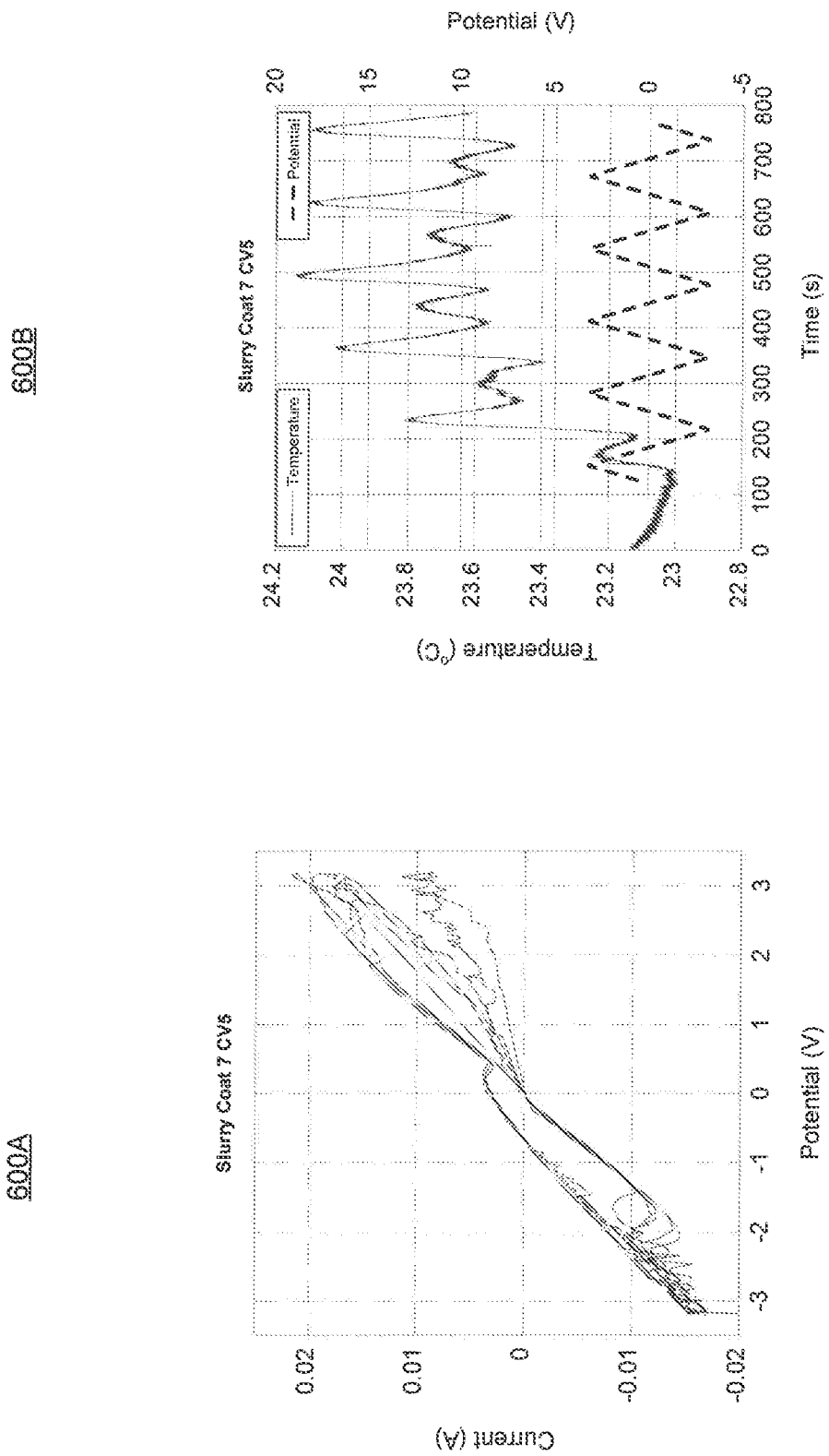

FIG. 6 are graphs 600A and 600B illustrating a change in energy, according to an embodiment of the present invention. In graph 600A, the CV shows nearly similar energy dissipation on positive and negative sweeps. In graph 600B, however, a higher temperature change is shown for negative sweeps. Given that the observed exothermic peak occurs at −2.7V and the endothermic peak occurs at 1V, both of which have superimposed exothermic Joule heating effects, the observation that the negative sweep shows greater temperature change is consistent with expected electrocaloric effects.

FIG. 7 are graphs 700A and 700B illustrating a change in energy, according to an embodiment of the present invention. Graphs 700A and 700B show that the temperature change is low with the positive voltage sweep, and higher with the negative voltage sweep as described above in relation to FIG. 6.

Some embodiments generally pertain to simple two-electrode electrocaloric test cells (the "cells") that are fabricated. The electrocaloric behavior of these cells may be tested as a function of temperature. In some embodiments, the cells are fabricated by thermal evaporation of single ion conducting solid electrolyte materials, which includes copper or silver doped amorphous sulfides and selenides of germanium and arsenic, with blocking electrodes (e.g. nickel films) on both sides of the material.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
   a solid electrolyte comprising a silver conducting electrolyte sandwiched between a first electrode and a second electrode, wherein
   the solid electrolyte when electrically biased by an electric field shows an electrocaloric effect.

2. The apparatus of claim 1, wherein the silver conducting electrolyte is composed of rubidium silver iodine ($RbAg_4I_5$).

3. The apparatus of claim 2, further comprising:
   a binder configured to keep the silver conducting electrolyte together, wherein
   the binder is composed of organic styrene-butadiene rubber material.

4. The apparatus of claim 1, wherein the first electrode is a nickel electrode situated on top of the solid electrolyte.

5. The apparatus of claim 1, wherein the second electrode is an indium tin oxide situated below the solid electrolyte.

6. The apparatus of claim 1, wherein the second electrode is a titanium electrode.

7. The apparatus of claim 1, further comprising:
   a graphite adhesive is used to make an aluminum foil contact the second electrode.

8. An electrocaloric device, comprising:
   a solid electrolyte sandwiched between a first electrode and a second electrode, wherein the solid electrolyte is a silver conducting electrolyte configured to show an electrocaloric effect when electrically biased by the application of an electric field; and
   a binder configured to keep the silver conducting electrolyte together.

9. The electrocaloric device of claim 8, wherein the silver conducting electrolyte is comprised of rubidium silver iodine ($RbAg_4I_5$).

10. The electrocaloric device of claim 8, wherein the silver conducting electrolyte is comprised of amorphous sulfides and selenides of germanium and arsenic with 35 atomic percent concentrations of dissolved silver or copper.

11. The electrocaloric device of claim 8, wherein the binder is comprised of an organic material.

12. The electrocaloric device of claim 11, wherein the organic material comprises one or more of polyvinylidene difluoride (PVDF), styrene-butadiene rubber (SBR), or both.

13. The electrocaloric device of claim 8, wherein the first electrode is a nickel electrode situated on top of the silver conducting electrolyte.

14. The electrocaloric device of claim 8, wherein the second electrode is an indium tin oxide situated (ITO) below the silver conducting electrolyte.

15. The electrocaloric device of claim 8, wherein the second electrode is a titanium electrode situated below silver conducting electrolyte.

16. The electrocaloric device of claim 8, wherein the first electrode and the second electrode are configured to allow an application of the electric field across the silver conducting electrolyte and inhibit electrochemical decomposition of the silver conducting electrolyte during the application of the electric field.

17. The electrocaloric device of claim 8, further comprising:
   thin non-conductive material coated onto the first electrode, the second electrode, or both, configured to inhibit electrochemical decomposition of the silver conducting electrolyte at the first electrode, the second electrode, or both the first electrode and the second electrode.

18. The electrocaloric device of claim 8, further comprising:
   a graphite adhesive configured to cause an aluminum foil to contact the second electrode, wherein the aluminum foil is configured to make low electrical resistivity contact with the first electrode, the second electrode, or both the first electrode and the second electrode.

19. An electrocaloric device, comprising:
   a solid electrolyte sandwiched between a first electrode and a second electrode, wherein
   the first electrode and the second electrode are configured to allow an application of an electric field across the silver conducting electrolyte and inhibit electrochemical decomposition of the silver conducting electrolyte during the application of the electric field, and
   the solid electrolyte is a silver conducting electrolyte configured to show an electrocaloric effect when electrically biased by the application of the electric field; and
   a binder configured to keep the silver conducting electrolyte together.

20. The electrocaloric device of claim 19, wherein the silver conducting electrolyte is comprised of rubidium silver iodine ($RbAg_4I_5$).

* * * * *